Nov. 16, 1965 W. L. BARR ETAL 3,217,591
ANGLED PLATE SCANNING INTERFEROMETER
Filed March 19, 1962

INVENTORS
WILLIAM L. BARR
BY ANDREW L. GARDNER

*Roland A. Anderson*
ATTORNEY

United States Patent Office 3,217,591
Patented Nov. 16, 1965

3,217,591
ANGLED PLATE SCANNING INTERFEROMETER
William L. Barr and Andrew L. Gardner, Livermore, Calif., assignors to the United States of America as represented by the United States Atomic Energy Commission
Filed Mar. 19, 1962, Ser. No. 180,911
6 Claims. (Cl. 88—14)

This invention relates to interferometers and, more particularly, to monitoring spectral line profiles.

Interferometers have found wide application in high resolution spectroscopy. These instruments measure wavelengths through means of light interference to provide analysis of a narrow spectrum range. In the field of plasma research, there is a prime need for apparatus that will continuously measure and monitor ion temperatures. As ion temperatures are known to affect the breadth of spectral lines radiated from a plasma, there is a need for an interferometer capable of continuously monitoring spectral line profiles.

With prior interferometers, such as the gas pressured, Fabry-Perot interferometer, a number of disadvantages are present. Measurement of wavelengths over a narrow spectrum band requires a cycling of inert gas within the interferometer housing. The removal and replacement of this gas enables the necessary gradual change in the index of refraction of the gas between the interferometer plates to achieve both wavelength selection and monitoring of the narrow spectrum band. However, the process does not provide a continuous monitoring or recording of temperature since the noted type of interferometer requires time interval delays for pumping out the admitted gas.

Accordingly, it is an object of this invention to provide an improved interferometer including angled interferometer plates in combination with a beam displacing device.

It is another object of the invention to provide an improved interferometer in which spectral line profiles are continuously monitored.

It is still another object of the invention to provide an improved interferometer for continuous recording of plasma temperatures as related to spectral line broadening.

It is another object of the invention to provide a method for monitoring spectral line profiles.

Figure 1:
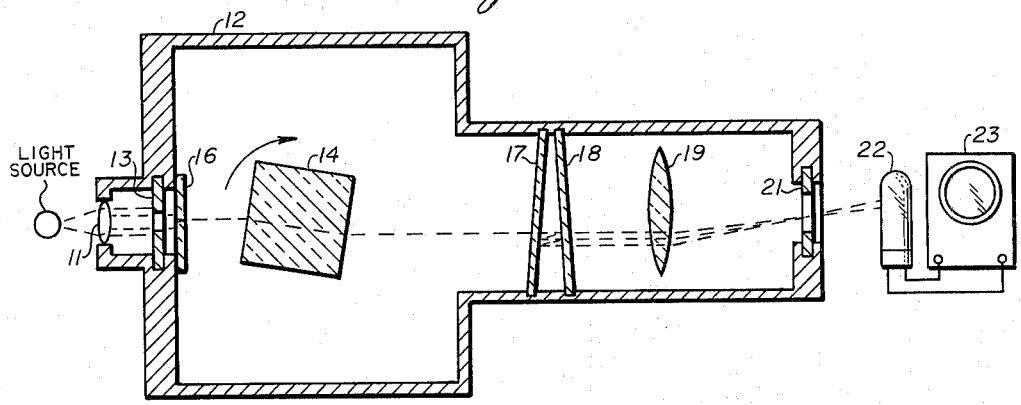
Figure 2:
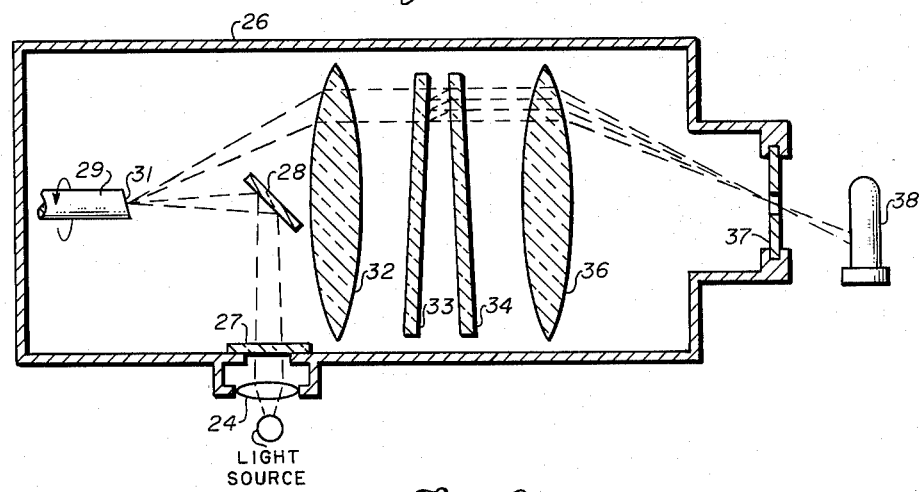
Figure 3:
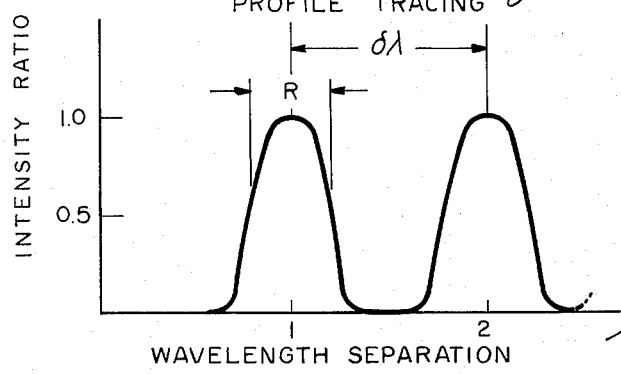

In the accompanying drawing, there is shown apparatus embodying the invention, in which:

FIGURE 1 is a cross-sectional illustration of an angled plate interferometer in combination with a parallel beam displacer embodying the invention wherein the angle of reflection at the facing surfaces of the slightly angled interferometer plates is exaggerated to better illustrate the existence of the reflections and their essentially parallel nature;

FIGURE 2 is a cross-sectional illustration of an angled plate interferometer in combination with a circular beam displacer embodying the invention wherein the angle of reflection at the facing surfaces of the slightly angled interferometer plates is exaggerated to better illustrate the existence of the reflections and their essentially parallel nature; and FIGURE 3 graphically illustrates a spectral line profile taken of the interferometer patterns.

In general, the present invention comprises an interferometer embodying a beam displacer in conjunction with a pair of slightly angled interferometer plates whereby a resultant interference pattern is produced when a beam of selected light is passed therethrough. The order of the interferometer pattern for a given wavelength changes as a result of gradually changing the interferometer plate spacing. Due to the angle of the plates, the interference pattern changes as the light beam is displaced perpendicular to the normal of the plane of the interferometer plates. It is to be noted that by changing the order of the interference pattern, a related change in light intensity at each position on the pattern is produced. In addition, focusing lenses, filters, and diaphragms are utilized to create a clearer interference pattern and to select a portion of the pattern for use with a photomultiplier tube. The photomultiplier tube records and monitors the profile of the spectral line by transmitting its intensity to a viewing oscilloscope or other commercial recording instruments.

Clearly, the advantage of the present invention over prior interferometers is the provision of steady viewing and recording of spectral line broadening, wherein the maximum and minimum variation of spectral light intensity may be made to cyclically occur over comparatively short time intervals in a continuous manner.

In the apparatus of FIGURE 1, there is shown an angled plate interferometer of the invention embodying a parallel beam displacer. The component parts and operation of the invention may be understood by referring to the light path as indicated in FIGURE 1. Light from a source is passed through a collimating lens 11, which transforms the divergent beam of light to a parallel beam. The parallel beam is passed through a first diaphragm 13 in housing 12. The light is filtered for a single spectral line through optical filter 16 mounted in coaxial alignment with diaphragm 13 within the housing and then directed into a rotating parallel beam displacer 14. The light is consecutively swept in a running manner over a vertical portion of interferometer plates 17 and 18, wherein the light is broken up into a plurality of parallel rays which are further passed into converging lens 19 for interference. The converging rays are stopped down by diaphragm 21 at the plane of focus, such that only a central portion of the resulting interference pattern is recorded by photomultiplier 22. The parallel displacement of the light with respect to the optics of the foregoing system enables the position of the center of the interference pattern to remain fixed at the plane of focus. The transmitted portion of the interference pattern is made to vary from maximum to minimum intensity due to the plate spacing as the light is displaced across the angled interferometer plates. Photomultiplier 22 records the intensity of the interferometer pattern and oscilloscope 23, connected to photomultiplier 22, provides visual viewing of the resulting light intensity profile.

In the invention, effective variation of wavelength for profile tracing is obtained by the use of slightly angled interferometer plates. More specifically, the light source is analyzed by passing a light ray thereof through two interferometer plates which are accurately slightly angled one with respect to the other, and which have partially reflecting interfacing surfaces. The light ray incident on the first surface of plate 17 is transmitted therethrough to a space between the plates wherein the ray striking the interfacing surface of plate 18 is broken by reflection and transmission. A first part of the ray is transmitted through plate 18 and the remaining part is reflected back and forth between the reflecting interfacing surfaces. This results in a series of rays being transmitted through plate 18 essentially parallel to one another. The rays are brought together for interference by converging lens 19 to form interference patterns.

In order to direct an incident ray successively along positions of gradually differing plate spacings such that the order of interference, but not the position of the interference pattern, is varied for profile tracing, a rotating beam displacer 14 is positioned between angled plates 17 and 18 and the light source to be analyzed. Parallel beam displacer 14 may be in the form of a rectangular prism of homogeneous transparent material, such as transparent resin or glass. The displacer is rotatably mounted about a transverse axis within housing 12. Due to the density of the material composition of the displacer 14, a light beam passing through the medium is refracted and thereby bent such that the light beam upon leaving the displacer is offset parallel to the original path by a distance dependent on the instantaneous position of the rotating displacer. The displacer may be either rotated or oscillated to continuously displace a beam of light in a vertical plane across angled interferometer plates 17 and 18.

An important feature of the invention is the traversal of the light beam along positions of gradually differing interferometer plate spacings to obtain interference patterns of variable light intensity. This traversing of light across angled interferometer plates is produced by the beam displacer.

The foregoing embodiment makes use of a parallelly traversing beam displacer 14 as shown in FIGURE 1. Another embodiment makes use of a circularly traversing beam displacer in conjunction with the fixed-positioned, angled interferometer plates of this invention and is hereindescribed below.

Referring now to the apparatus of FIGURE 2, light from a source is passed through a converging lens 24 set in housing 26 for focusing the light beam. The light beam is filtered for a single spectral line through optical filter 27, and then directed to a fixed diagonal mirror 28 such that the beam is reflected at right angles. The beam is then received at an end of a rotating shaft 29 on a reflecting surface 31 which is at the focal point of the converging lens and is located at the end of said shaft serving as a circular beam displacer. Shaft 29 is angled and truncated at the reflecting surface in order to accurately angle the light beam from mirror 28 into a converging lens 32 mounted directly behind mirror 28 for collimating the light beam. The light is then continuously swept in a circular manner over a vertical portion of angled interferometer plates 33 and 34, wherein the light beam is broken up into a plurality of parallel rays which are further passed into converging lens 36 for interference. The converging rays are stopped down by diaphragm 37 and the resulting interference patterns recorded by photomultiplier 38.

In general, it should be kept in mind that the primary function of an interferometer is to produce an accurate interferometer pattern. The measurement of the fringes of the pattern specifies a particular wavelength. In the invention, an added function is to produce continuous monitoring of the narrow spectrum range closely associated with this particular wavelength by varying the light intensity of the interference patterns to form a profile tracing of the spectral line.

One of the known causes of observable line breadths (spectral line broadening) is the Doppler effect. The Doppler effect causes a varied distribution in the frequencies observed from many atoms moving at random according to the kinetic theory of gases. With increasing temperature, the increased random motion creates addional broadening of the line. Thus, a spectral line profile may be indicative of the temperature of the gas source. In FIGURE 3, there is shown a profile line tracing resulting from an interference pattern due to varying the interference order. The frequency scale of the profile tracing is established by the following equation:

$$\delta\lambda = \lambda^2 / 2t \qquad (1)$$

where $\delta\lambda$ is the wavelength separation between interference orders as shown in FIGURE 3, $\lambda$ is the wavelength of the filtered light, and $t$ is the instantaneous plate spacing. The particle temperature of a gas source may be calculated by using the observable line breadth R when the spectral line broadening is due to the temperature of the emitting particles. The line breadth R is measured at the half-intensity mark as shown in FIGURE 3.

By observing the center of the fringe pattern, a spectral range may be scanned to provide a continuous monitoring of the line width and thus a monitoring of particle temperatures of a light emitting source.

While there has been described two preferred embodiments of the present invention, it will be understood that changes may be made without departing from the spirit of the invention, and therefore only such limitations should be imposed as are indicated in the appended claims.

What is claimed is:

1. In an interferometer for continuously recording the light intensity profile of spectral lines, the combination comprising an interferometer housing, a collimating lens mounted in an aperture in said housing, a first diaphragm mounted within said housing in light receiving relation to said lens, a transparent prism parallel beam displacer rotatably mounted within said housing in light receiving relation to said diaphragm, light filter means interposed between said diaphragm and said displacer, a pair of interferometer plates angled one with respect to the other to provide path length variations between facing surfaces thereof mounted centrally within said housing and disposed to receive light from said displacer, a light converging lens mounted in optical alignment with said plates to receive light therefrom and bring the rays thereof together for interference, a second diaphragm positioned to transmit a selected portion of interference light passing through said converging lens, a photomultiplier mounted in said housing to view the light intensity of said light transmitted through said second diaphragm, and means connected to said photomultiplier for directly recording the light intensity.

2. In an interferometer for continuously tracing the light intensity profiles of spectral lines, the combination comprising a housing, a first converging lens for focusing light rays mounted in an aperture in said housing, a mirror for redirecting light rays from said lens, filter means interposed between said first lens and said mirror, a rotating shaft mounted in alignment to said mirror to receive light rays on an angled truncated, highly reflecting surface thereof, means for rotating said shaft to circularly displace said light rays, a pair of interferometer plates angled one with respect to the other to provide path length variations between facing surfaces thereof mounted centrally within said housing, a second converging lens for receiving and collimating said light rays from said surface and directing them in parallel relation onto said plates, a third light converging lens mounted in optical alignment with said plates to receive light therefrom and bring the rays thereof together for interference, a diaphragm positioned with respect to said converging lens to transmit a selected portion of said rays of said interference light received therefrom, a photomultiplier mounted in said housing to view the light intensity of said rays transmitted through said diaphragm, and means connected to said photomultiplier for directly recording said profiles.

3. In an interferometer for continuously scanning the intensity profile of a selected segregated spectral line beam of light, the combination comprising collimator means, light beam displacer means operating in unison with said collimator means arranged to receive said segregated light beam and continuously convert same into a sweeping light beam, at least one pair of interferometer plates mounted in mutually angled relation to provide path length variations between facing surfaces thereof and arranged to receive said sweeping light beam thereon and convert same into a multiplicity of displaced parallel light beams, lens means for bringing said multiplicity of parallel light beams into interfering relation to provide a variable intensity interference light profile output therefrom, and means receiving said light output for sensing and recording the intensity profile of said interference light output.

4. An interferometer for continuously scanning the intensity profile of a selected segregated spectral line beam of light comprising collimator means, light beam displacer means operating in unison with said collimator means arranged to receive said segregated light beam and continuously traverse same over a selected area, at least one pair of interferometer plates mounted in mutually angled relation to provide path length variations between facing surfaces thereof and arranged in said selected area to receive said traversing light beam and convert same into a multiplicity of displaced parallel light beams, lens means for bringing said multiplicity of parallel light beams into interfering and converging relationship to provide a variable intensity interference light profile output therefrom, and means receiving said light output for sensing and recording the intensity profile of said interference output 5. In an interferometer for continuously segregating and scanning the light intensity profile of spectral lines of a light beam derived from a source of light, the combination comprising a housing, a first converging lens mounted within a first aperture of said housing and adapted and constructed for collimating a beam of light emanating from said source, a first diaphragm mounted within said housing in optical alignment with and adjacent said first lens and substantially normal to said beam of light, a parallel beam displacer including a transparent prism having at least two parallel surfaces and mounted within said housing adjacent said diaphragm on a rotary axis parallel to said surfaces whereby said beam of collimated light received from said diaphragm is transmitted therethrough and is displaced parallelly, an optical filter formed for selecting a single spectral line interposed between said diaphragm and said displacer substantially parallel to said diaphragm and normal to said beam of light, a pair of interferometer plates having partially reflecting interfacing surfaces disposed within said housing accurately slightly angled one with respect to the other to provide path length variations between interfacing surfaces thereof and mounted substantially normal to said collimated beam of light and disposed to receive said light from said displacer, a second converging lens for collimating said light beam mounted in optical alignment with said plates and formed for focusing the light therefrom in interference pattern generating relation, a second diaphragm mounted in a second aperture of said housing positioned at the focus of said second lens to receive said light beam from said plates through said second lens and to transmit a selected portion of said light beam therethrough, a photomultiplier mounted outside said housing and disposed to sense the light intensity profile of said light beam transmitted through said second diaphragm, and means electrically communicating with said photomultiplier for directly recording said light intensity profile of said spectral line.

6. An interferometer for continuously segregating and scanning the light intensity profile of a spectral line of a light beam from a source of light, the combination comprising a housing, a first converging lens for focusing said light emanating from said source mounted in a first aperture in said housing, a mirror disposed within said housing for intercepting and redirecting said converging light beam, an optical filter formed for selecting a single spectral line interposed normal to the central axis of said focusing beam and between said first lens and said mirror, a rotating shaft having an angled truncated highly reflecting end surface, said end surface disposed in said housing at the focal point of said first lens, means for rotating said shaft to circularly displace said light beam, a second converging lens disposed to receive said circularly displaced light beam in a circular pattern and formed for collimating said light beam, a pair of interferometer plates having partially reflecting interfacing surfaces disposed within said housing accurately slightly angled one with respect to the other to provide path length variations between interfacing surfaces thereof and mounted substantially normal to said collimated beam of light and disposed to receive said light from second lens, a third converging lens mounted in optical alignment with said plates to receive said collimated light beam from said plates and formed for focusing said collimated light beam, a second diaphragm mounted in a second aperture of said housing positioned at the focus of said third lens to transmit a selected portion of said light beam, a photomultiplier mounted outside said housing and disposed to receive the light intensity profile of said light beam transmitted through said third diaphragm, and means electrically communicating with said photomultiplier for recording said light intensity profile of said spectral line.

References Cited by the Examiner
UNITED STATES PATENTS

| | | | |
|---|---|---|---|
| 2,265,780 | 12/1941 | Von Baeyer | 88—14 |
| 2,405,731 | 8/1946 | Beggs et al. | 88—2.3 |

FOREIGN PATENTS

| | | |
|---|---|---|
| 394,285 | 6/1933 | Great Britain. |

OTHER REFERENCES

Karandikar: "Un Etalon Fabry-Perot Pour L'Etude De La Raie Verte Dans La Lumiere Du Ciel Nocturne" Revue d'Optique, vol. 35, No. 7, 1956, pages 414–420.

Kruger et al.: German application 1,074,170, printed Jan. 28, 1960, (K1 21 g 29/30).

Williams: Applications of Interferometry, John Wiley and Sons, Inc., pages 40, 41.

JEWELL H. PEDERSEN, *Primary Examiner.*